United States Patent [19]

Tapia-Egoavil

[11] Patent Number: 5,754,497
[45] Date of Patent: May 19, 1998

[54] METHOD FOR LOCATING STRUCTURE-BORNE SOUND EVENTS IN PRESSURE ENCLOSURES TO BE MONITORED IN POWER PLANTS

[75] Inventor: Carlos Tapia-Egoavil, Kleinsendelbach, Germany

[73] Assignee: Siemens Aktiengesellschaft, Munich, Germany

[21] Appl. No.: 789,485

[22] Filed: Jan. 27, 1997

[30] Foreign Application Priority Data

Jan. 26, 1996 [DE] Germany ............... 196 02 811.6

[51] Int. Cl.$^6$ ............... G01S 3/80; G01N 29/12
[52] U.S. Cl. ............... 367/127; 367/124; 367/904; 73/572; 73/587; 364/550; 364/460
[58] Field of Search ............... 73/40.5 A, 40.5 R, 73/587, 572, 801, 602; 367/118, 121, 124, 126, 127, 907, 129; 364/550, 460; 376/249, 252

[56] References Cited

U.S. PATENT DOCUMENTS

| | | |
|---|---|---|
| 3,858,439 | 1/1975 | Nakamura . |
| 4,317,186 | 2/1982 | Nishi et al. ............... 367/127 |
| 4,459,851 | 7/1984 | Crostack ............... 73/587 |
| 4,586,378 | 5/1986 | Izumi et al. ............... 73/572 |
| 4,592,034 | 5/1986 | Sachse et al. ............... 367/127 |
| 4,609,994 | 9/1986 | Bassim et al. ............... 364/551 |
| 4,641,526 | 2/1987 | Izumi et al. ............... 73/572 |
| 4,897,823 | 1/1990 | Krien ............... 367/127 |
| 4,979,124 | 12/1990 | Sachse et al. ............... 364/507 |

OTHER PUBLICATIONS

"Acoustic emission source location on a spherical or plane surface", M. Asty, NDT International, Oct. 1978, pp. 223–226.

"KÜS Körperschall-Überwachungssystem", (Structure-borne Sound Monitoring System), Siemens Energieerzeugung, Catalog No. A96001–U54–A251, Aug. 1994, pp. 1–5.

Primary Examiner—Hezron E. Williams
Assistant Examiner—Rose M. Miller
Attorney, Agent, or Firm—Herbert L. Lerner; Laurence A. Greenberg

[57] ABSTRACT

A method for locating structure-borne sound events in pressure enclosures to be monitored in power plants, includes positioning sensors at various locations on a pressure enclosure. Signals are picked up with each of the sensors upon arrival of a sound wave generated by a structure-borne sound event and propagating along the pressure enclosure. The signals are stored in recording devices disposed downstream. A location of the structure-borne sound event is determined with a hyperbolic section method, from transit time differences resulting from different arrival times of the sound wave at two different sensors. Each range of possible speed values for the propagation of the generated sound wave is made a basis of one respective structure-borne sound event. The hyperbolic section method is performed separately for each speed value of the range for outputting a location indication with an error. The location with the least error is selected as the most likely location of the structure-borne sound event. No discrete speed of sound needs to be supplied to the method, and it determines the location of a structure-borne sound event with an absolute minimum of error.

4 Claims, 2 Drawing Sheets

1

METHOD FOR LOCATING STRUCTURE-BORNE SOUND EVENTS IN PRESSURE ENCLOSURES TO BE MONITORED IN POWER PLANTS

BACKGROUND OF THE INVENTION

FIELD OF THE INVENTION

The invention relates to a method for locating structure-borne sound events in pressure enclosures to be monitored in power plants, which includes positioning sensors at various locations on a pressure enclosure, picking up signals with each of the sensors upon arrival of a sound wave generated by a structure-borne sound event and propagating along the pressure enclosure, storing the signals in recording devices disposed downstream, and determining a location of the structure-borne sound event with a hyperbolic section method, from transit time differences resulting from different arrival times of the sound wave at two different sensors.

During operation of a power plant, especially a nuclear power plant, structure-borne noises occur, which are caused by coolant flow, the sound of rotation of pumps, and other components, such as valve and control elements, that are mounted in or on the pressure enclosure and actuated intermittently, as well as by one or more monotonous background noises. Individual structure-borne sound events are also produced if loose parts strike the walls of the pressure enclosure, especially the reactor pressure vessel, or hit loosened parts.

Fast and accurate detection of loose or loosened parts is necessary for early detection of damage or for avoiding consequent damage, so that in the final analysis safe operation of a nuclear power plant can be assured. One method which is suitable for that purpose is known, for instance, from a publication entitled "KÜS Köorperschall Überwachungssystem"[Structure-borne Sound Monitoring System], Siemens Energieerzeugung [Siemens Energy Production], Catalog No. A96001-U54-A251, Printed in Germany, August 1994 M 154081 PA 08941.

In known structure-borne sound monitoring systems, numerical iteration methods are used, namely the gradient method or the Newton method, to process transit time differences of a sound wave tripped or generated by a structure-borne sound event to various sensors positioned on a pressure enclosure. Those methods begin with the assumption of a location for a structure-borne sound event, which is varied in increments, while minimizing error, for the resultant transit time differences either until a predeterminable tolerance threshold for the error is attained, or, if the location is changed, until the transit time difference errors increase again.

Those methods suffer from the disadvantage of requiring an accurate value for the speed of sound to be specified to them. However, it is precisely in the field of structure-borne sound that such a value is strongly influenced by the material, temperature and modal type and is therefore not accurately known for the propagation of the sound wave of a single structure-borne sound event.

Another disadvantage is a premature discontinuation of that method if a relative minimum for the errors in the transit time differences is reached. As a result, an absolute error minimum, which may be present under some circumstances and by which the location of the structure-borne sound event could have been located more accurately, is lost to that method.

SUMMARY OF THE INVENTION

It is accordingly an object of the invention to provide a method for locating structure-borne sound events in pressure enclosures to be monitored in power plants, which overcomes the hereinafore-mentioned disadvantages of the heretofore-known methods of this general type, which need not be supplied with a discrete value for the speed of sound and which ascertains a location with an absolute minimum of error in a transit time difference as the best or most likely location of a structure-borne sound event.

With the foregoing and other objects in view there is provided, in accordance with the invention, a method for locating structure-borne sound events in pressure enclosures to be monitored in power plants, which comprises positioning sensors at various locations on a pressure enclosure; picking up signals with each of the sensors upon arrival of a sound wave generated by a structure-borne sound event and propagating along the pressure enclosure; storing the signals in recording devices disposed downstream; determining a location of the structure-borne sound event with a hyperbolic section method, from transit time differences resulting from different arrival times of the sound wave at two different sensors; making each range of possible speed values for the propagation of the generated sound wave a basis of one respective structure-borne sound event; performing the hyperbolic section method separately for each speed value of the range for outputting a location indication with an error; and selecting the location with the least error as the most likely location of the structure-borne sound event.

Since the location method is performed for all values that characterize a range of possible speeds of sound for the propagation of the sound wave tripped by a structure-borne sound event, the limitation to a discrete speed value is eliminated. A separate performance of the hyperbolic section method with outputting of a location indication for the structure-borne sound event and its error for every speed value of the range, because of an error comparison of all of the results, makes it possible to select the location having absolutely the least error as the best location. As a by-product of the method, one learns the speed of sound that is associated with the location finding having the least error.

In accordance with another mode of the invention, there is provided a method which comprises processing transit time differences of four sensors with the hyperbolic section method, for a speed value that is kept constant, by initially performing location-finding operations with the transit time differences of three of the four sensors; determining, from each of the transit time differences, a theoretical transit time difference to the fourth sensor, and comparing the theoretical transit time difference with the actually picked up transition time difference to the fourth sensor; and outputting or buffer-storing as a result the location indication having the least deviation in the transit time difference to the fourth sensor, together with the location indication error corresponding to that deviation. As a result, a complete location finding is achieved with the smallest possible number of sensors.

In accordance with a concomitant mode of the invention, there is provided a method which comprises performing location finding operations with transit time differences of three sensors on a surface of the pressure enclosure formed as a developed view in one plane, on one hand for real positions of the sensors and on the other hand for virtually shifted positions of the sensors; and shifting sensor positions to virtual sensor positions for including, as possible locations of the structure-borne sound event, locations on the surface of the pressure enclosure whose shortest path or connection to a sensor, extending along the pressure enclosure, is interrupted by the developed view. This means that recourse may be made to the simple formalism of planar location finding, even with more-complicated geometrical surface forms of the pressure enclosure.

Other features which are considered as characteristic for the invention are set forth in the appended claims.

Although the invention is illustrated and described herein as embodied in a method for locating structure-borne sound events in pressure enclosures to be monitored in power plants, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2A–2D are developed views of a surface of a cylindrical pressure enclosure, in which FIG. 2A shows real positions of sensors and FIGS. 2B, 2C and 2D show virtually shifted positions of sensors.

DESCRIPTION OF THE PREFERRED EMBODIMENTS

Figure 1:
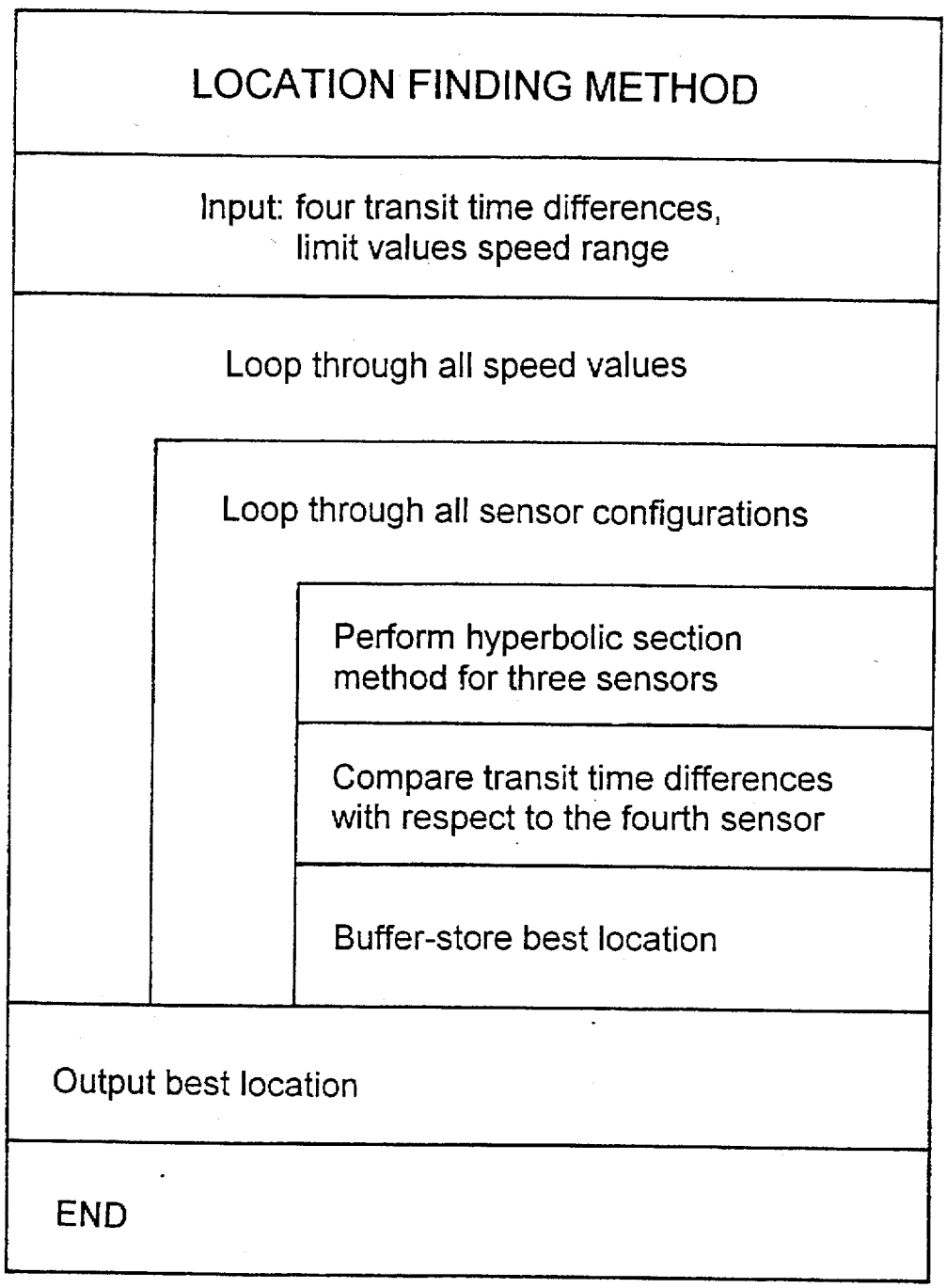
FIG. 1 is a structogram showing a method according to the invention.

Referring now to the figures of the drawings in detail and first, particularly, to FIG. 1 thereof, there is seen an illustration of a location finding method according to the invention, in which transit time differences of a sound wave originating at a location of a structure-borne sound event from two sensors at a time of four sensors that are positioned on a surface of a pressure enclosure are detected, along with limit values for a range of speed values. Next, a loop of speed values that characterize the predetermined range is executed. Within this loop, a loop through all configurations of three of the four sensors is executed for a speed that is kept constant, that is both the real and the virtually shifted positions of these three sensors. First a location finding operation by the hyperbolic section method, then a comparison of the-resultant theoretically expected transit time difference and the actually picked up transit time difference with respect to the fourth sensor, and finally a buffer storage of the location having the least error, are performed for each configuration. Once all of the speed values and all of the sensor configurations have been run through, the method ends with an output of a location that has absolutely the least error.

Figure 2A:
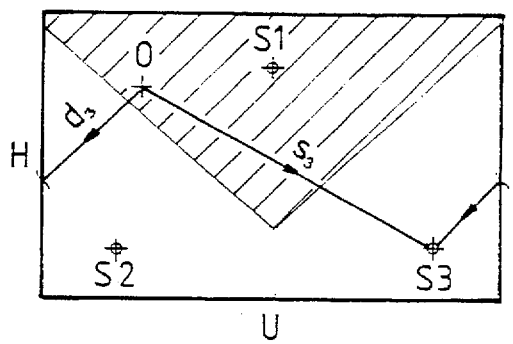
Figure 2B:
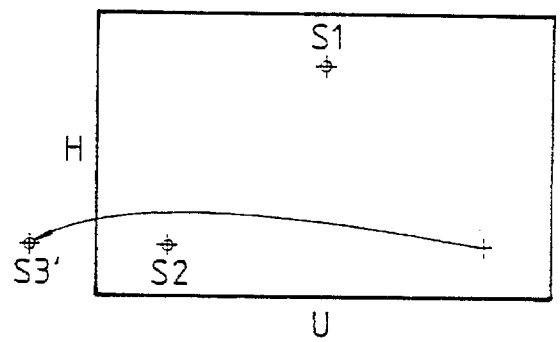
Figure 2C:
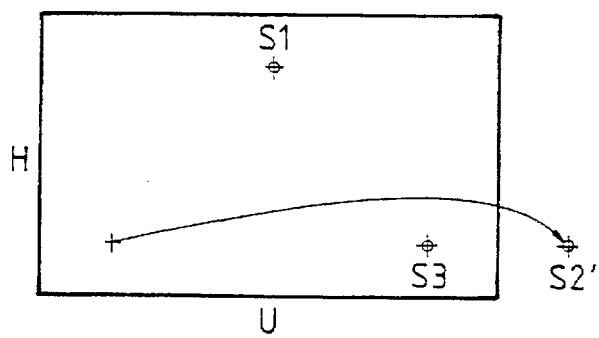
Figure 2D:
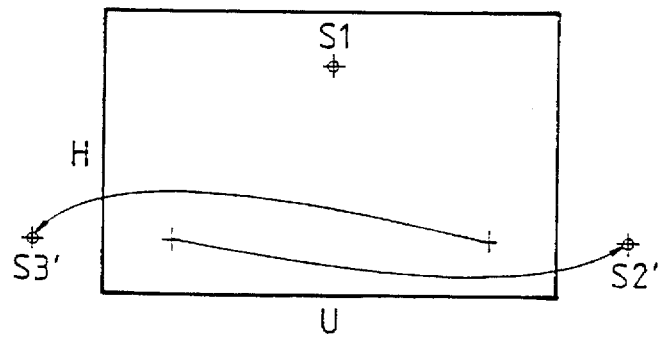

FIGS. 2A–2D are developed views of a cylindrical surface of a pressure enclosure, such as a reactor pressure vessel, shown as a rectangle having a height that corresponds to a height H of the cylinder and width that corresponds to a circumference U of the cylinder. An example for real positions of three is sensors S1, S2 and S3 is plotted in FIG. 2A. On the assumption that the sensor S1 has been the first to pick up a signal of a sound wave of a structure-borne sound event, a shaded area marks a region in which the structure-borne sound event might have occurred. For instance, if the event occurred at a location O, whose path or connection $s_3$ to the sensor S3 within the developed view does not correspond to a shortest distance $d_3$ from the sensor S3 on the cylinder jacket surface, then the hyperbolic section method, with the measured transit time differences, would ascertain a location that deviates from the location O. A correct location finding is obtained through the use of a virtual shifting of the position of the sensor S3 by one cylinder circumference to position S3' shown in FIG. 2B. Analogously, location finding operations with shifted sensor positions S2' in FIG. 2C and S2' and S3' in FIG. 2D are carried out, in order to encompass all of the points of the surface as possible locations of structure-borne sound events.

I claim:

1. A method for locating structure-borne sound events in pressure enclosures to be monitored in power plants, which comprises:

positioning sensors at various locations on a pressure enclosure;

picking up signals with each of the sensors upon arrival of a sound wave generated by a structure-borne sound event and propagating along the pressure enclosure;

storing the signals in recording devices disposed downstream;

determining a location of the structure-borne sound event with a hyperbolic section method, from transit time differences resulting from different arrival times of the sound wave at two different sensors;

making each range of possible speed values for the propagation of the generated sound wave a basis of one respective structure-borne sound event;

performing the hyperbolic section method separately for each speed value of the range for outputting a location indication with an error; and selecting the location with the least error as the most likely location of the structure-borne sound event.

2. The method according to claim 1, which comprises processing transit time differences of four sensors with the hyperbolic section method, for a speed value that is kept constant, by initially performing location-finding operations with the transit time differences of three of the four sensors;

determining, from each of the transit time differences, a theoretical transit time difference to the fourth sensor, and comparing the theoretical transit time difference with the actually picked up transition time difference to the fourth sensor; and outputting as a result the location indication having the least deviation in the transit time difference to the fourth sensor, together with the location indication error corresponding to that deviation.

3. The method according to claim 1, which comprises:

performing location finding operations with transit time differences of three sensors on a surface of the pressure enclosure formed as a developed view in one plane, for real positions of the sensors and for virtually shifted positions of the sensors; and shifting sensor positions to virtual sensor positions for including, as possible locations of the structure-borne sound event, locations on the surface of the pressure enclosure whose shortest path to a sensor, extending along the pressure enclosure, is interrupted by the developed view.

4. The method according to claim 2, which comprises:

performing location finding operations with transit time differences of three sensors on a surface of the pressure enclosure formed as a developed view in one plane, for real positions of the sensors and for virtually shifted positions of the sensors; and shifting sensor positions to virtual sensor positions for including, as possible locations of the structure-borne sound event, locations on the surface of the pressure enclosure whose shortest path to a sensor, extending along the pressure enclosure, is interrupted by the developed view.

* * * * *